F. Fischbeck,

Traveling Bag.

No. 4,060. Reissued July 5. 1870.

Witnesses
S. S. Stout
C. H. Kille

F. Fischbeck
By Farwell, Ellsworth & Co
Attorneys.

N. PETERS, PHOTO-LITHOGRAPHER, WASHINGTON, D. C.

United States Patent Office.

FREDRICK FISCHBECK, OF CHICAGO ILLINOIS.

*Letters Patent No.* 86,742, *dated February* 9, 1869; *reissue No.* 4,060, *dated July* 5, 1870.

IMPROVEMENT IN TRAVELING-BAGS.

The Schedule referred to in these Letters Patent and making part of the same

*To all whom it may concern:*

Be it known that I, FREDRICK FISCHBECK, of Chicago, in the county of Cook and State of Illinois, have invented certain new and useful Improvements in Traveling-Bags; and I do hereby declare the following to be a full, clear, and exact description of the same, sufficient to enable others skilled in the art to which the invention appertains to fully understand and use the same, reference being had to the accompanying drawing, which is made a part of this specification.

This invention has reference to the class of traveling-bags in which the leather or other flexible material of which the bag is chiefly composed is attached to a metallic frame, consisting of two parts which are hinged together at the bottom of the bag, so as to open and close as jaws.

Bags as heretofore made have a rod extending along the bottom longitudinally, to afford attachment for the leather bottom-piece by stitching.

My improvement provides a flat bar at the bottom of the bag, as a better means for the attachment of the base proper or leather bottom-piece.

In bags made after the old plan the covering at the joints or hinges of the jaws, as well as the joints themselves, are likely, in use, soon to yield and give way.

I protect the joints or hinges by making continuous that part of the metallic frame-work which is attached to one of the jaws, and aids in giving form and strength to the bag, so that said part shall encompass or extend around the hinges, and thence extend across the bottom, it being thus adapted to form and constitute the flat bar for the attachment of the leather bottom of the bag, as above mentioned.

I further provide for the protection of the lower corners and the hinges thereat by a special attachment hereinafter particularly described.

In the drawing—

Figure 1 presents an elevation of the interior of one side of the bag, exhibiting one of the jaws, and the continuous metallic part or frame attached thereto. In this view the bottom of the bag and one of the lower corners are shown in section.

The metallic frame-work consists of the jaws A A′ and the endless or continuous part B, the latter being attached rigidly to the jaw A in any suitable manner, so as to constitute, as it were, a portion of one of said jaws.

The part B being continuous, extends along the bottom of the bag, as shown at B′, and hence said part may form or afford in itself the flat bar above mentioned, for the attachment of the bottom C of the leather work of the bag, dispensing with the usual rod.

Each end of the jaw A is bent at right angles, so as to pass on the inside of the bottom piece or bar B′, to which it is fastened at each end by a rivet, *b*.

Figure 1:
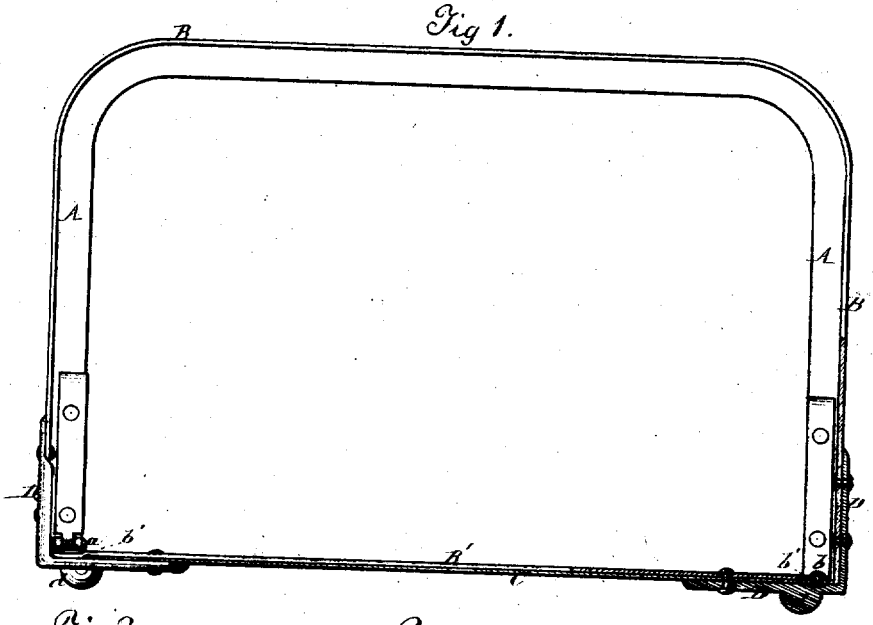
Figure 3:
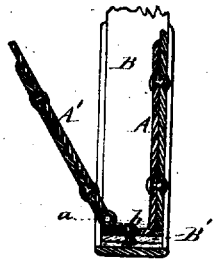
Figures 3 and 4 are detached views of the lower corners of the bag.
Figure 4:
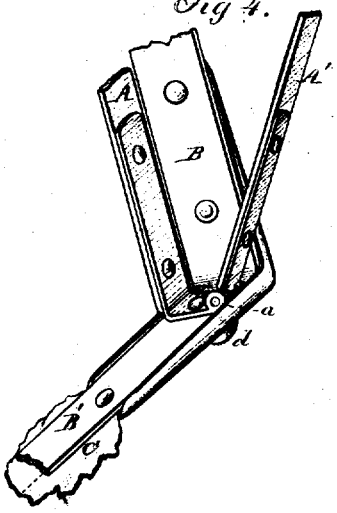

The ends of the jaw A are united to those of the jaw A′ by a pin or pintle, *a*, said ends being spliced or otherwise adapted to be conveniently hinged together. (See figs. 3 and 4.)

The lower part B′ of the continuous frame B, I usually bend slightly at *b*′, and when the outer bottom-covering C is put on, the recess between B′ and C is filled with paper, wood, or other material.

The continuous frame B B′ extends around and outside of the joints *a* of the jaws A A′, and is thus made to protect said joints, and impart strength and durability to the lower corners of the bag.

By the use of the flat bar B′, which I provide with holes at the proper intervals, I am enabled to fasten the bottom leather or covering by means of nails or rivets, and the partition usually found in traveling-bags may also be secured in place by the same rivets.

This mode of securing the bottom of the bag to the bottom of the frame is superior to that heretofore in use, being much cheaper and more durable, and the heads of the rivets or nails employed also afford additional protection to the bottom against external injury.

Figure 2:
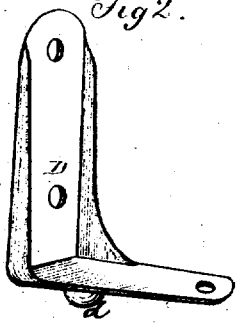
Figure 2 is a perspective view of the special attachment or corner-protector.

After the covering has been put upon the metallic frame above described, I secure and protect the corners at the joints or hinges, and strengthen the frame at these points by means of a protector of peculiar form. (See fig. 2.)

This protector is a metallic casting of the form shown, with a knob or projection, *d*, on the under side, furnishing an additional resting-point when the bag is set down, and contributing to protect the bottom from wear.

The protector has lateral embracing-flanges, to secure increased capability of resistance and endurance under rough usage. The protector is attached to the frame by means of rivets, and is an ample safeguard against the injury or disfigurement of the corners of the traveling-bag.

I prefer to make the continuous frame B B′ of a single piece, but it may consist of two or more pieces united.

Having thus described my invention,

What I claim as new herein, and desire to secure by Letters Patent, is—

1. A traveling-bag frame, having a flat bottom bar or piece for the attachment of the bottom part of the covering, substantially as and for the purpose described.

2. The provision, in a traveling-bag frame, of the continuous part B, substantially as and for the purpose set forth.

3. The continuous frame B′, formed with the bends *b′* in the bottom, near the ends, substantially as and for the purpose specified.

4. The metallic protector D, constructed and applied substantially as and for the purpose set forth.

Witnesses: FREDRICK FISCHBECK.

A. W. HART,

JACOB F. HENRY.